United States Patent [19]

Pariani

[11] Patent Number: 4,466,773
[45] Date of Patent: Aug. 21, 1984

[54] COUNTERTORQUE ROTOR FOR HELICOPTERS

[75] Inventor: Emilio Pariani, Cardano Al Campo, Italy

[73] Assignee: Costruzioni Aeronautiche Giovanni Agusta S.p.A., Italy

[21] Appl. No.: 337,441

[22] Filed: Jan. 6, 1982

[30] Foreign Application Priority Data

Feb. 5, 1981 [IT] Italy ............................... 67154 A/81

[51] Int. Cl.³ .................................................. B64C 11/12
[52] U.S. Cl. ................................... 416/134 A; 416/148
[58] Field of Search ............... 416/134 A, 134 R, 102, 416/148, 122, 123

[56] References Cited

U.S. PATENT DOCUMENTS

| | | | |
|---|---|---|---|
| 2,369,048 | 2/1945 | Hays | 416/134 A |
| 2,487,653 | 11/1949 | Heintze | 416/134 A X |
| 3,790,302 | 2/1974 | Pascher | 416/134 A |
| 3,804,552 | 4/1974 | Covington | 416/134 A |
| 3,807,896 | 4/1974 | Johnson | 416/134 A X |
| 4,115,031 | 9/1978 | Drees et al. | 416/134 A |
| 4,333,728 | 6/1982 | Drees et al. | 416/134 A |

*Primary Examiner*—Everette A. Powell, Jr.
*Attorney, Agent, or Firm*—Kane, Dalsimer, Kane, Sullivan and Kurucz

[57] ABSTRACT

A countertorque rotor for helicopters in which a transmission shaft keyed transversely onto a drive shaft and disposed obliquely within a hub has each of its ends coupled in a slidable manner within an inner bush of an associated elastomeric coupling this latter carrying screw actuator means which can act axially on the said shaft to displace the said hub with respect to the shaft (3) itself in the direction of the axis of this latter.

3 Claims, 2 Drawing Figures

COUNTERTORQUE ROTOR FOR HELICOPTERS

BACKGROUND OF THE INVENTION

The present invention relates to a countertorque rotor for helicopters. In particular, the present invention relates to a countertorque rotor having a simple and rapid balancing system.

In countertorque rotors for helicopters it is known to utilise a tubular hub carrying at its axial ends two blades and provided centrally with two oblique coaxial tubular projections within which there is axially slidably mounted a transverse shaft centrally keyed onto one end of a drive shaft which extends into the interior of the hub through a radial hole formed therein.

In the known rotors described above the said transverse shaft is maintained in a fixed axial position within the said two tubular projections by means of two closure covers fitted to the free ends of the tubular projections and traversed by respective central axial screws which engage associated threaded axial holes formed on the opposite ends of the said transverse shaft.

On each of the said screws there is normally mounted a plurality of thin washers in a stack between the associated end of the said transverse shaft and the relative cover. The presence of these washers permits the dynamic balancing of the rotor about the axis of the drive shaft, which can be effected by taking off the said covers and moving one or more washers from one side to the other of the said transverse shaft. In fact the displacement of a washer corresponds to an equal displacement in the opposite sense of the hub with respect to the drive shaft in the direction of the axis of the said transverse shaft.

From what has been described above it is clearly apparent how the balancing procedure of the known countertorque rotors described above normally requires the repeated removal and replacement of the said two covers and is, because of this, particularly time consuming and complicated.

SUMMARY OF THE INVENTION

The object of the present invention is that of providing a countertorque rotor for helicopters the balancing of which can be obtained in a simple and rapid manner without requiring the dismantling and re-assembly of any mechanical parts.

The said object is achieved by the present invention in that it relates to countertorque rotor for helicopters comprising a tubular hub radially traversed by a drive shaft angularly connected to a transmission shaft extending through the said hub and along two tubular projections inclined thereto, the said shaft being connected to each of the said projections by means of an elastomeric coupling, characterised by the fact that each said elastomeric coupling includes two bushes disposed with the first within the second and connected together by a block of elastomeric material, the said first bush being slidably coupled to the said shaft, and actuator means being interposed between the said shaft and the said first bush for axially displacing this latter along the said shaft.

BRIEF DESCRIPTION OF THE DRAWINGS

Further characteristics and advantages of the present invention will become apparent from the following description with reference to the attached drawings, which illustrates a non-limitative embodiment thereof, in which.

DETAILED DESCRIPTION OF THE INVENTION

Figure 1:
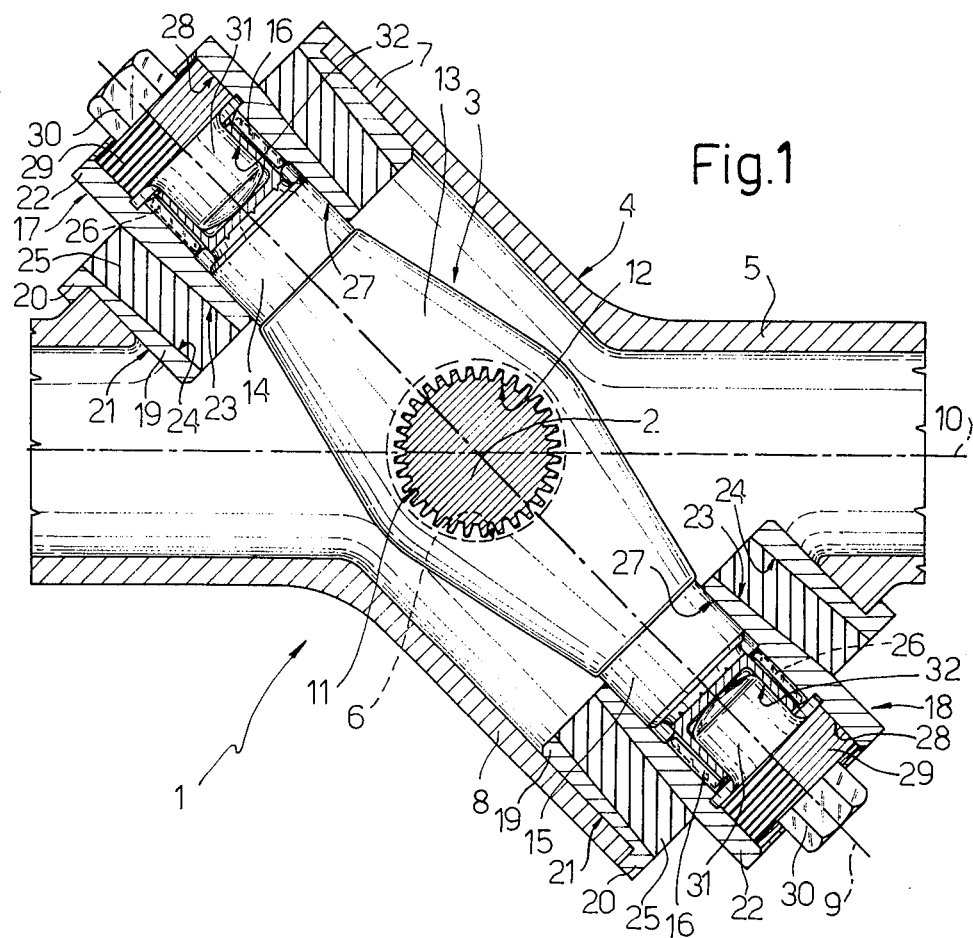
FIG. 1 partially illustrates, in axial section, a countertorque rotor formed according to the principles of the present invention.

The drawings listed above illustrates a countertorque rotor generally indicated 1 and driven to rotate by a drive shaft 2 via the interposition of a transverse transmission shaft 3 lodged within a hub 4 of the rotor 1.

As illustrated in FIG. 1, the hub 4 includes a tubular cylindrical body 5 centrally provided with a radial hole 6 receiving the drive shaft 2, and carrying engaged on its opposite ends two radial blades not illustrated.

The tubular body 5 has two tubular projections 7 and 8 coaxial with one another, a common axis 9 of which lies at angle with respect to an axis 10 of the tubular body 5 and intersects both the axis 10 and the axis of the drive shaft 2.

The drive shaft 2 has, within the tubular body 5, a splined head 11 keyed to splines 12 within the hole 6 formed diametrically through a central part 13 of the shaft 3. The part 13 of the shaft 3 is constituted by a solid of revolution in the form of a double cone the opposite sides of which taper from the centre towards the periphery and is provided, at its opposite ends, with two cylindrical axial projections 14 and 15, each comprising a grooved end section 16.

The projections 14 and 15 extend into the interior of the tubular projections 7 and 8 respectively, to which latter they are connected by means of respective elastomeric couplings 17 and 18.

Figure 2:
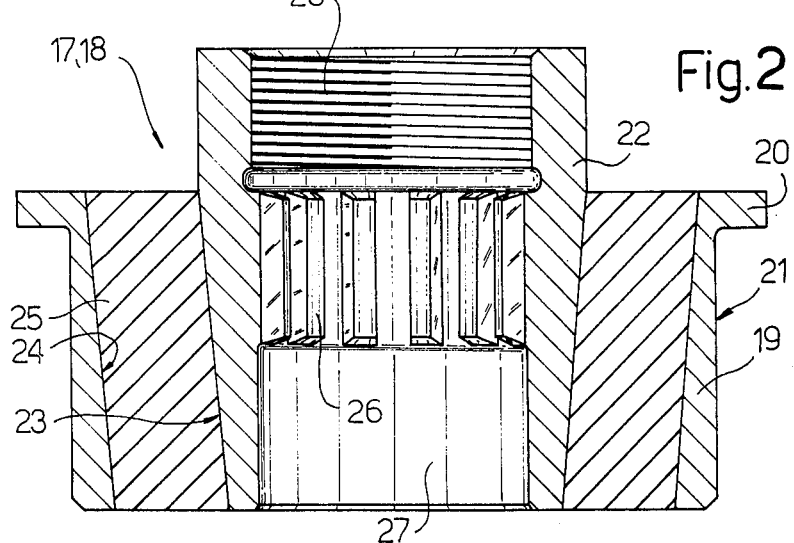
FIG. 2 is a section on an enlarged scale of a detail of FIG. 1.

As illustrated in FIG. 2, each elastomeric coupling 17,18 includes an outer metal bush 19 provided with an end flange 20 positioned in contact with the free end of the associated tubular projections 7,8 and limited externally by a cylindrical surface 21 coupled to an inner cylindrical surface of the associated tubular projection 7,8.

Within the bush 19 there is positioned a second metal bush 22 coaxial with the bush 19 and limited externally by a frusto-conical surface 23. This latter is connected to a similar inner frusto-conical surface 24 of the bush 19 by means of an annular block 25 of elastomeric material rigidly connected to the bushes 19 and 22.

The bush 22 has an inner surface comprising an intermediate grooved section 26 coupled in a slidable manner to the grooved section 16 of the associated projection 14,15 and interposed between a cylindrical section 17 fitted on the associated projection 14,15 and a threaded section 28 disposed externally of the block 25 and engaged by a threaded block 29. This latter is provided with an hexagonal outer head 30 and an axial cylindrical projection 31 facing the drive shaft 2 and rotatably mounted within an axial cavity 32 formed on the free end of the associated projection 14,15.

As illustrated in FIG. 1, the length of the projections 31 is greater than the depth of the associated cavity 32.

In use, the assembly of the two threaded blocks 29 constitutes a simple and effective actuator device operable to permit a continuous adjustment of the balancing of the hub about the axis of the shaft 2 within a range of variation defined by the length of the threaded sections 28. In fact, by turning the two blocks 29 in opposite senses, or rather by screwing down one of the two blocks 29 and unscrewing the other block 29 by the same amount it is possible to translate the axis 10 parallel to itself in a direction parallel to the axis 9 and in a sense such as to cancel any possible imbalance present in the rotor.

Naturally, the principle of the invention remaining the same, numerous possible variations could be introduced to the countertorque rotor 1 described without by this departing from the scope of the present invention.

I claim:

1. A countertorque rotor for helicopters comprising a tubular hub (4), a transmission shaft (3) extending through the hub (4) and coplanar therewith, a drive shaft (2) extending radially through said hub (4) and angularly connected to said transmission shaft, and two couplings (17, 18) each connecting a respective end of said transmission shaft (3) to a respective portion of said hub (4), each said coupling (17, 18) comprising an inner bush (22) slidably coupled to said transmission shaft (3), and adjustable actuator means (29) interposed between the said shaft (3) and each said bush (22) for axially displacing this latter along said shaft (3).

2. A countertorque rotor according to claim 1, wherein each of said actuator means comprises a threaded section (28) formed on an inner surface of the respective bush (22) and a threaded block (29) coupled to said section (28) being disposed axially in contact with the respective end of said shaft (3).

3. A countertorque rotor according to claim 2, wherein an axial cavity (32) is provided on each end of said transmission shaft (3), and each said block (29) has an axial projection (31) rotatably engaging the respective axial cavity (32) and having a greater length than the depth of said cavity (32).

* * * * *